Dec. 1, 1964   H. I. BARRETT   3,158,879
LID REMOVER AND REPLACER
Filed Dec. 19, 1961   2 Sheets-Sheet 1
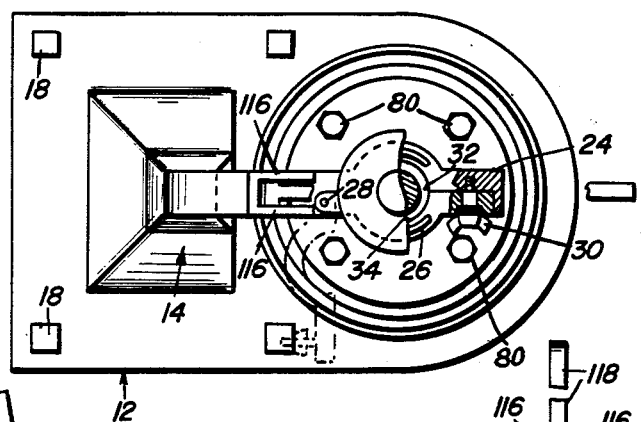
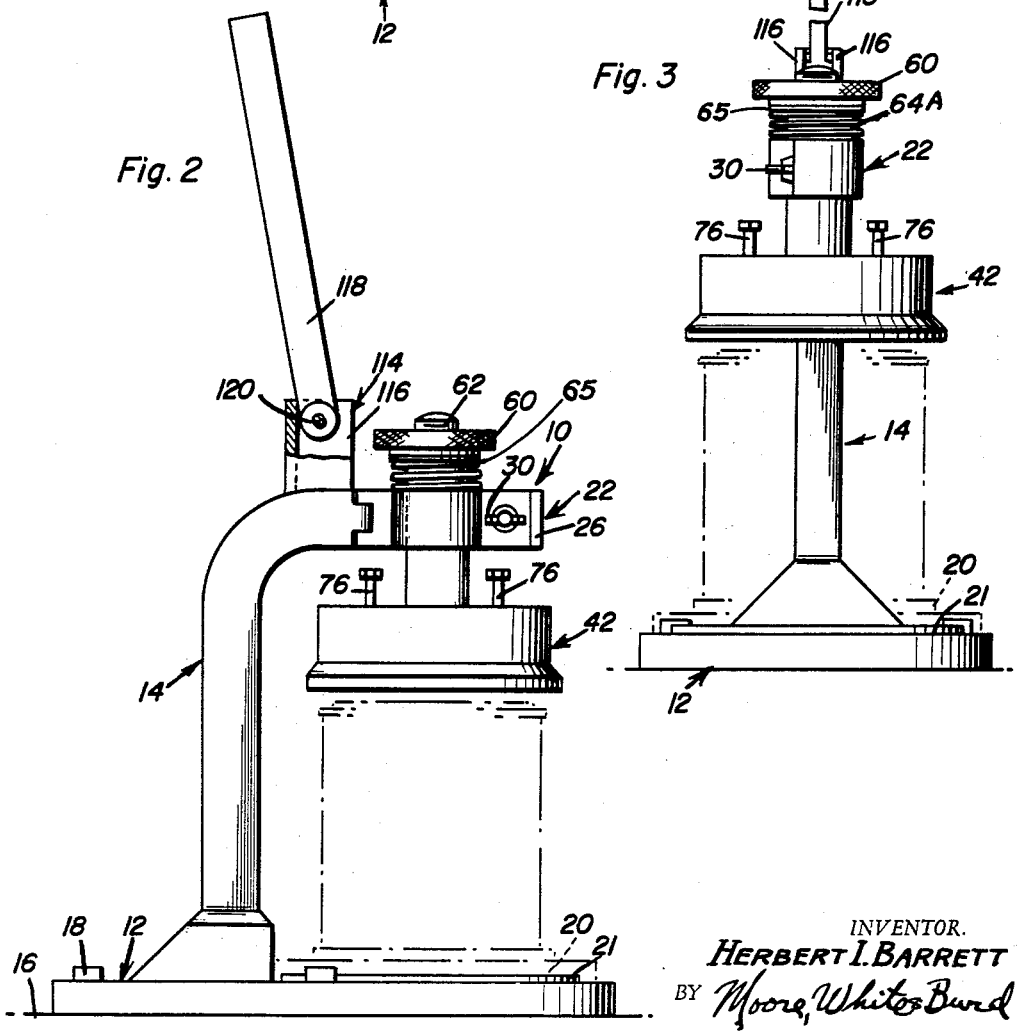
INVENTOR.
HERBERT I. BARRETT
BY Moore, White & Burd
Attorneys

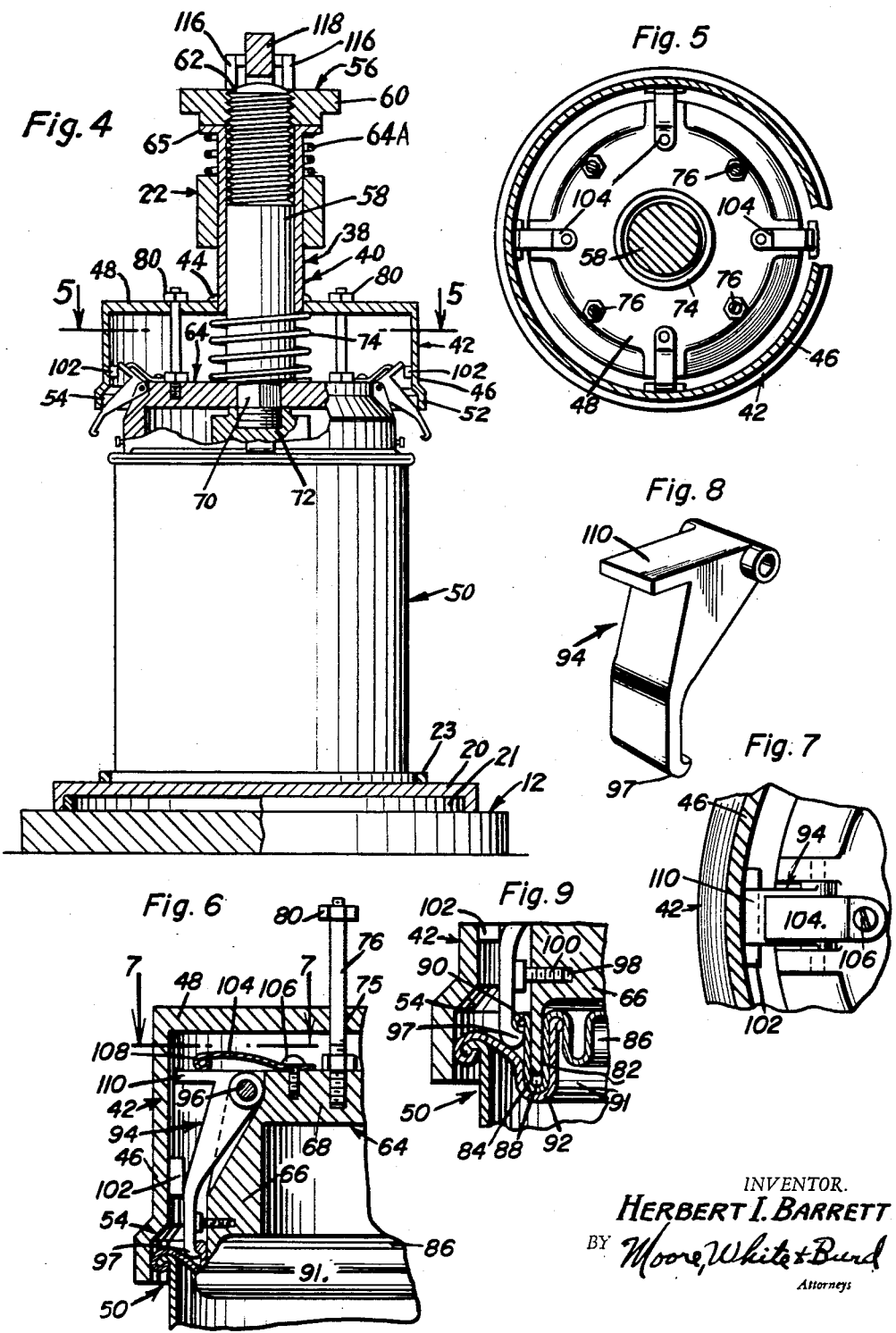

United States Patent Office 3,158,879
Patented Dec. 1, 1964

3,158,879
LID REMOVER AND REPLACER
Herbert I. Barrett, 525 Burlington, Missoula, Mont.
Filed Dec. 19, 1961, Ser. No. 160,611
12 Claims. (Cl. 7—14.6)

This invention relates to a novel and useful lid remover and replacer assembly for containers of the type having an outer annular partial top wall defining an opening with the inner peripheral edge portion of the top wall defining an upwardly opening annular groove and provided with a removable lid for closing the opening which includes an outer annular portion depending from the outer edges of the lid that defines an upwardly opening annular channel with its lower surfaces receivable in the groove formed in the annular partial top wall of the container and including an outer outwardly projecting lip portion by which the lid may be removed from engagement with the partial top wall. Containers of this type are commonly used in the marketing of various types of liquids such as paint and associated products. Although it is not always the case, it is often-times necessary to open and close a paint container of this type several times and if the lid is securely fastened each time it is closed, paint adhering to the mating surfaces of the lid and container have a tendency to bond the lid and container together. Accordingly, subsequent attempts to remove the lid from the container are more difficult and if a screw driver or similar prying tool is utilized in an attempt to again remove the lid, such as is the usual practice, the screw driver, being capable of engaging only one point of the lid about its periphery, will bend the outwardly projecting lip portion of the lid upwardly. Accordingly, while the lid may be removed one or two times after the container has been opened initially, subsequent attempts to remove the lid by means of a screw driver quite frequently are futile inasmuch as the upwardly deflected lip does not present a suitable abutment surface against which to engage the blade of a screw driver.

Accordingly, it is the main object of this invention to provide an apparatus capable of effectively removing and replacing the lid of a container such as that hereinbefore set forth without rendering damage to the lid whereby the number of times the lid may be removed from the container after being disposed in sealing engagement therewith will not be limited.

A further object of this invention, in accordance with the immediately preceding object, is to provide a lid remover and replacer assembly including means for engaging the outwardly projecting lip portion of the lid of a container at points spaced circumferentially thereabout for removing the lid and with means for engaging with the outer annular portion depending from the outer edges of the lid throughout substantially its entire length for replacing the lid and urging the latter downwardly into engagement with the partial top wall of a container.

A further object of this invention is to provide a lid remover and replacer assembly of the type including a base having a standard secured at its lower end to said base and including a laterally offset upper portion disposed above said base upon which a head assembly is mounted and is movable toward and away from the base with the head portion provided with first and second downwardly facing abutment means adapted for engagement with the outer portions of the top wall and receivable in the upwardly opening groove respectively at points disposed therearound with the second abutment means being movable relative to the first abutment means toward and away from the base and including means for engagement under the lip portion of the lid at points spaced thereabout.

A still further object of this invention, in accordance with the immediately preceding object, is to provide means on the base portion of the assembly for embracing the lower end of the container and positioning the container in alignment with the direction of movement of the head assembly toward and away from the base.

A further object of this invention is to provide a lost motion connection between the first and second abutment means which is adjustable whereby movement of one of the abutment means may be utilized to effect movement of the other abutment means.

A final object to be specifically enumerated herein is to provide a lid remover and replacer assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the lid remover and replacer assembly with portions thereof being broken away and shown in section and an alternate position of a component part thereof shown in phantom lines;

FIGURE 2 is a side elevational view of the assembly with parts thereof being broken away and shown in section;

FIGURE 3 is a front elevational view of the assembly;

FIGURE 4 is an enlarged front elevational view of the assembly at the beginning of the final phase of lid replacement with parts thereof being broken away and shown in section;

FIGURE 5 is a horizontal sectional view taken substantially upon the plane indicated by the section line 5—5 of FIGURE 4;

FIGURE 6 is an enlarged fragmentary vertical sectional view showing the manner in which the assembly may be utilized to remove the lid of a container;

FIGURE 7 is a fragmentary horizontal sectional view taken substantially upon the plane indicated by the section line 7—7 of FIGURE 6;

FIGURE 8 is a perspective view of one of the hook members utilized by the second abutment means of the assembly for engaging the outwardly projecting lip portion of a lid to be removed; and FIGURE 9 is an enlarged fragmentary sectional view similar to that of FIGURE 6 but on a larger scale.

Referring now more specifically to the drawings the numeral 10 generally designates the lid remover and replacer assembly of the instant invention.

It may be seen that the assembly 10 includes a base generally designated by the reference numeral 12 which has the lower end of a standard generally referred to by the reference numeral 14 fixedly secured thereto in any convenient manner. The base 12 may be secured to any suitable supporting surface 16 by means of fasteners 18 secured to the base and the base may be seen to include an annular ring portion 20 of a predetermined size which is telescoped over an upwardly projecting annular rib 21 on the upper surface of the base 12 and includes an upwardly projecting rib 23 for embracingly engaging the lower end of a container supported from the base 12.

The upper end of the standard 14 includes a horizontally disposed laterally directed arm portion generally referred to by the reference numeral 22 and it may be seen from FIGURES 1 and 2 of the drawings that the outer end of the arm portion 22 includes a rigid arm member 24 and a movable arm member 26 which is pivotally secured to the rigid arm member 24 by means of a pivot pin 28 for movement between the open position illustrated in phantom lines in FIGURE 1 of the drawings and the closed position secured to the arm member 24 by means of wing nut 30 as shown in solid lines in FIGURE 1. The arm members 24 and 26 include confronting semi-circular recesses 32 and 34, respectively, and the recesses 32 and 34, when the arm member 26 is in the closed position, define a journal portion for slidably receiving the tubular shank portion generally referred to by the reference numeral 38 of the first abutment means which is generally designated by the reference numeral 40.

The first abutment means 40 has a downwardly opening cylindrical member generally referred to by the reference numeral 42 secured to the lower end of the tubular shank portion 38 in any convenient manner such as by welding 44 and it will be noted that the cylindrical member 42 includes a cylindrical portion 46 and a top wall portion 48. From FIGURE 4 of the drawings it may be seen that a container generally referred to by the reference numeral 50 may have its lower end received within the annular rib 23 of ring 20 carried by the base 12 in order that the container 50 is axially aligned with the tubular shank portion 38. The cylindrical portion 46 is carried concentrically by the lower end of the tubular shank portion 38 and the lower end of the cylindrical portion 46 includes a diametrically enlarged portion 52 which is adapted to embrace the upper end of the container 50 and is defined by a shoulder portion 54. The shoulder portion 54, as can best be seen from FIGURE 6 of the drawings, is disposed for abutting engagement with the upper portion of the container 50 which is embraced by the diametrically enlarged portion 52.

With attention now directed to FIGURES 4 and 6 of the drawings, it will be seen that a second abutment means generally referred to by the reference numeral 56 is provided and includes a shaft portion 58 which projects through the tubular portion 38 and has an adjusting nut 60 threadedly engaged with the externally threaded upper end portion 62 thereof. A compression spring 64A is disposed between the confronting surfaces of the radially outwardly projecting flange 65 of the tubular shank portion 38 and the arm portion 22 and normally resiliently urges both the first and second abutment means upwardly away from the base 12. However, a generally cylindrical member referred to in general by the reference numeral 64 includes a cylindrical portion 66 and a top wall portion 68 and is secured to the lower end of the shaft 58 by means of a diametrically reduced end portion 70 of the shaft 58 being secured through the middle of the top wall portion 68 by means of a threaded retainer 72 which comprises a permanent magnet.

A compression spring 74 is disposed between the confronting surfaces of the top wall portions 48 and 68 and normally urges the cylindrical member 64 downwardly of the cylindrical member 42.

The top wall portion 48 has a plurality of apertures 75 formed therethrough and a plurality of rod-like stop members 76 are secured in threaded blind bores 78 formed in the top wall portion 68 and have their upper end portions slidably disposed through the apertures 75 and provided with enlarged upper end portions 80 for adjustably limiting movement of the top wall portion 68 away from the top wall portion 48. In addition, it will be noted that the adjusting nut 60 adjustably limits movement of the top wall portion 68 relative to the top wall portion 48.

From FIGURE 9 of the drawings it may be seen that the cylindrical portion 66 includes a depending annular rib 82 which is seatingly receivable in the upwardly opening outer annular depending portion 84 of the lid 86 of the container 50. The outer annular portion 84 defines an upwardly opening annular channel 88 in which the rib 82 is receivable and the outer annular portion 84 terminates in an outer outwardly projecting annular lip portion 90. The container 50 includes an annular partial top wall 91 that defines an upwardly opening annular groove 92 in which the outer annular portion 84 is snugly receivable.

It will be noted that the cylindrical member 64 has a plurality of depending hook members generally referred to by the reference numerals 94 pivotally secured thereto by means of pivot pins 96 for movement of their hooked lower end portions 97 toward and away from the cylindrical portion 66. In addition, it will be noted that each of the cylindrical portions 66 includes an internally threaded bore 98 for each of the hook members 94 in which there is disposed an adjusting screw 100 for limiting inward movement of the corresponding hooked lower end portion 97. In addition, the cylindrical portion 46 includes an abutment member 102 for each hook member 94 and it will be noted that each hook member 94 is resiliently urged toward a position with its hooked lower end portion 97 engaging the corresponding screw 100 by means of a leaf spring 104 that is secured to the top wall portion 68 at one end by means of a fastener 106 and whose free end 108 engages an outwardly projecting lug 110 carried by the corresponding hook member 94. In addition, it will be noted that each of the lugs 110 is disposed for engagement with the corresponding abutment 102.

With attention now directed to FIGURE 2 of the drawings it will be seen that the inner end of the arm portion 22 has a bifurcated mount generally referred to by the reference numeral 114 mounted thereon between whose furcations 116 an actuating lever 118 is pivotally mounted by means of pivot pin 120. It will be noted that the free end of the lever 118 may be swung downwardly into engagement with the upper end of the shaft 58 and utilized to urge the shaft 58 downwardly against the thrust of the compression spring 64A.

In operation, when it is desired to remove the lid 86 from the container 50, the adjusting nut 60 is first raised or lowered on the shaft 58 whereupon the cylindrical member 64 is lowered or raised relative to the cylindrical member 42 through the lost motion connection between them assisted by spring 74, to such a position that hooked members 94 are free from engagement with abutment members 102. The container 50 is positioned so that lower end of the cylindrical portion 66 is disposed immediately above the channel 88. Handle 118 is brought over into engagement with the top of shaft 58. Handle 118 is used to exert pressure against the shaft to compress spring 64A. This forces the first and second abutment means downwardly. When the bottom edges of the lower end portions 97 of hook members 94 strike the lip portion 90 of lid 86 they are urged outward, around, and (because of springs 104) under the lip. The handle 118 is then raised out of the way. Because the entire abutment assembly is now attached to a heavy container which offsets the upward action of spring 64a, the assembly is maintained in a downward position. Then, the adjusting nut 60 is moved downwardly on the shank portion 58 which will urge the cylindrical portion 46 downwardly to position its diametrically enlarged portion 52 about the upper end of the container 50 while simultaneously urging the hooked lower end portions 97 of the hook members 94 into tight clamping engagement with the lip portion 90 of the lid 86 through the camming action of abutments 102. Then, continued downward movement of the adjusting nut 60 on the shaft 58 will force the shoulder portion 54 into engagement with the upper end of the container 50 and thereafter lift the cylindrical member 64 relative to the cylindrical member 42. In this manner, the hook members 94 will each move relative to the corresponding abutment 102 and will lift the lid 86 from engagement with the top wall 91. As the lid 86 is removed from engagement with the top wall 91, the retainer or magnet 72 will magnetically attract the lid 86. Freeing the lid 86 from the container frees the weight of the container and its contents from the abutment assembly permitting compression spring 64A to expand and raise the abutment assembly. The lid is held by the hook members 94. It will be noted that the compression spring 64A has sufficient resiliency to urge both of the abutment members 40 and 56 away from the container 50.

When it is desired to close the container 50, with spring 64A still expanded to support the abutment assembly, the cylindrical member 64 is lowered relative to the cylindrical member 42 by raising adjusting nut 60. This allows spring 74 to separate the two abutment means. At the point when pressure exerted by abutments 102 against the lower portions of hook members 94 is released, magnet 72 attracts, raises slightly and holds the lid 86 upwardly. This also releases section 97 of members 94 from the lid 90. Continued raising of nut 60 lowers cylindrical portion 64 until the lugs 110 of hook members 94 engage the corresponding abutments 102 and pivot the lower ends of the hook members 94 outwardly. The downward movement of cylindrical member 64 is limited by means of diametrically enlarged portions 80 being moved into engagement with the top wall portion 48. Magnet 72 is now holding the lid 86 with rib 82 disposed in channel 88. If it is desired, the lid can be removed from the machine at this point. However, if it is not, to complete replacement of the lid, the entire assembly of the first and second abutment means 40 and 56 may be urged downwardly by means of the lever 118, in which instance the rib 82 will press the lid 86 firmly into sealing engagement with the channel 92 in the annular partial top wall 91. When this is accomplished, as handle 118 is raised, spring 64A again raises the assembly free of the container 50.

It will be noted that the abutments 102 are received in relieved portions of the corresponding hook members 94 and that movement of the cylindrical member 64 downwardly relative to the cylindrical portion 42 will engage the lugs 110 with the abutments 102. However, before the lugs 110 can be pivoted a sufficient distance to clear the abutment 102, the lower portion of each of the hook members 94 will engage the inside of the lower end of the cylindrical member 42, thereby defining a stop position which will retain the hook members 94 in downwardly and outwardly divergent out-of-the-way positions enabling the rib 82 to be readily engaged with the lid 86 to replace the lid.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A lid remover and replacer assembly for containers of the type having an outer annular partial top wall defining an opening, the inner peripheral edge portion of said top wall defining an upwardly opening annular groove, a removable lid for said opening, said lid including an outer annular portion depending from the outer edges of said lid, defining an upwardly opening annular channel snugly receivable in said groove and including an outer outwardly projecting lip portion; said assembly comprising a stand having a base including a standard secured at its lower end to said base and including a laterally offset upper portion disposed above said base, a head assembly mounted on said offset portion and movable toward and away from said base between the latter and said offset portion, first and second downwardly facing abutment means carried by said head and including means for engagement respectively with the outer portions of said top wall and receivable in said groove respectively at points disposed therearound, said second abutment means being movable relative to said first abutment means towards and away from said base and including means for engagement under said lip portion at points spaced thereabout, and operating means to raise said second abutment means relative to said first abutment means thereby removing the lid from the container, said same operating means operable to lower said second abutment means relative to said first abutment means thereby positioning said second abutment means for replacing the lid on the container.

2. The combination of claim 1 wherein said base includes means adapted to embrace the lower end of said container and position the latter in alignment with the direction of movement of said head assembly.

3. The combination of claim 1 including means for adjustably positioning said second means relative to said first means.

4. The combination of claim 1 including means normally resiliently urging said head assembly away from said base.

5. The combination of claim 4 wherein said operating means includes manually operable means for moving said head assembly toward said base against the force of said urging means.

6. The combination of claim 1 wherein said engagement means comprises depending hook members pivotally secured to said second abutment means for movement of the lower ends thereof about axes extending at right angles to the direction of movement of said head assembly toward and away from the bottom edge of said second abutment means and the center line of said head assembly extending along its direction of movement.

7. The combination of claim 6 including means normally resiliently urging the lower hook ends of said hook members inwardly toward said center line.

8. The combination of claim 7 wherein each of said hook members includes means engageable with coacting portions of said first abutment means for pivoting said hook members away from said center line upon the lowering of said second abutment means relative to said first abutment means beyond a predetermined point.

9. The combination of claim 8 wherein said coacting means also includes means for camming said hook members inwardly upon downward movement of said first abutment means relative to said second abutment means beyond a predetermined point.

10. The combination of claim 1 including a lost motion connection between said first and second abutment means, said connection comprising a tubular shank portion secured to said first abutment means, a shaft portion secured to said second abutment means and partially extending through said tubular portion and a compression spring around said shaft portion between said first and second abutment means and urging against said tubular portion.

11. The combination of claim 1 wherein said second abutment means includes magnetic means adapted to magnetically secure said lid in seated engagement with said second abutment means.

12. The combination of claim 1 including a lost motion connection between said first and second abutment means comprising a tubular shank portion secured to said first abutment means, a shaft portion secured to said second abutment means and partially extending through said tubular portion and a compression spring around said shaft portion between said first and second abutment means and urging against said tubular portion, said lost motion connection including adjustable stop means for adjustably limiting movement of said second abutment means relative to said first abutment means in both directions.

References Cited in the file of this patent

UNITED STATES PATENTS

| | | |
|---|---|---|
| 1,065,638 | Thelen | June 24, 1913 |
| 1,386,131 | Massie | Aug. 2, 1921 |
| 2,566,598 | Castner | Sept. 4, 1951 |
| 2,878,632 | Foresman | Mar. 24, 1959 |

FOREIGN PATENTS

| | | |
|---|---|---|
| 567,908 | Italy | Oct. 17, 1957 |